US009999010B2

(12) United States Patent
Segev

(10) Patent No.: US 9,999,010 B2
(45) Date of Patent: Jun. 12, 2018

(54) SYSTEM AND METHODS OF TIME SYNCHRONIZATION BETWEEN WIRELESSLY CONNECTED DEVICES

(71) Applicant: Intel IP Corporation, Santa Clara, CA (US)

(72) Inventor: Jonathan Segev, Tel Mond (IL)

(73) Assignee: Intel IP Corporation, Santa Clara, CA (US)

(*) Notice: Subject to any disclaimer, the term of this patent is extended or adjusted under 35 U.S.C. 154(b) by 203 days.

(21) Appl. No.: 14/934,739

(22) Filed: Nov. 6, 2015

(65) Prior Publication Data

US 2016/0345277 A1 Nov. 24, 2016

Related U.S. Application Data

(60) Provisional application No. 62/165,075, filed on May 21, 2015.

(51) Int. Cl.
| | |
|---|---|
| *H04J 3/06* | (2006.01) |
| *H04W 56/00* | (2009.01) |
| *H04L 5/00* | (2006.01) |
| *H04W 8/00* | (2009.01) |
| *H04W 84/12* | (2009.01) |
| *H04W 88/04* | (2009.01) |

(52) U.S. Cl.
CPC ......... *H04W 56/001* (2013.01); *H04L 5/0055* (2013.01); *H04W 8/005* (2013.01); *H04W 84/12* (2013.01); *H04W 88/04* (2013.01)

(58) Field of Classification Search
CPC ... H04W 56/001; H04W 8/005; H04W 84/12; H04W 88/04; H04L 5/0055
See application file for complete search history.

(56) References Cited

U.S. PATENT DOCUMENTS

| | | | |
|---|---|---|---|
| 2014/0065964 A1* | 3/2014 | Turunen | H04W 8/005 455/41.2 |
| 2015/0257028 A1* | 9/2015 | Chu | G01S 13/74 370/252 |
| 2016/0150499 A1* | 5/2016 | Aldana | H04L 5/0055 455/456.2 |

* cited by examiner

*Primary Examiner* — Sai Ming Chan
(74) *Attorney, Agent, or Firm* — Schwegman Lundberg & Woessner, P.A.

(57) ABSTRACT

An access point (AP), station (STA) and method of providing synchronizing the STA are generally described. The STA may transmit to the AP a Fine Timing Measurement (FTM) request and/or trigger frame. The STA may capture a STA Time Synchronization Function (TSF) value of the time the FTM request/trigger frame is transmitted to the AP as determined by the STA. The AP may determine an AP TSF value of the time the of the FTM request/trigger frame was transmitted by the AP as determined by the AP and transmit at least part of the AP TSF time to the STA in a FTM response frame. The STA may compare the STA TSF value and the AP STA value and adjust the STA TSF dependent on the difference between the AP TSF value and the STA TSF value to synchronize to the AP TSF value.

29 Claims, 6 Drawing Sheets

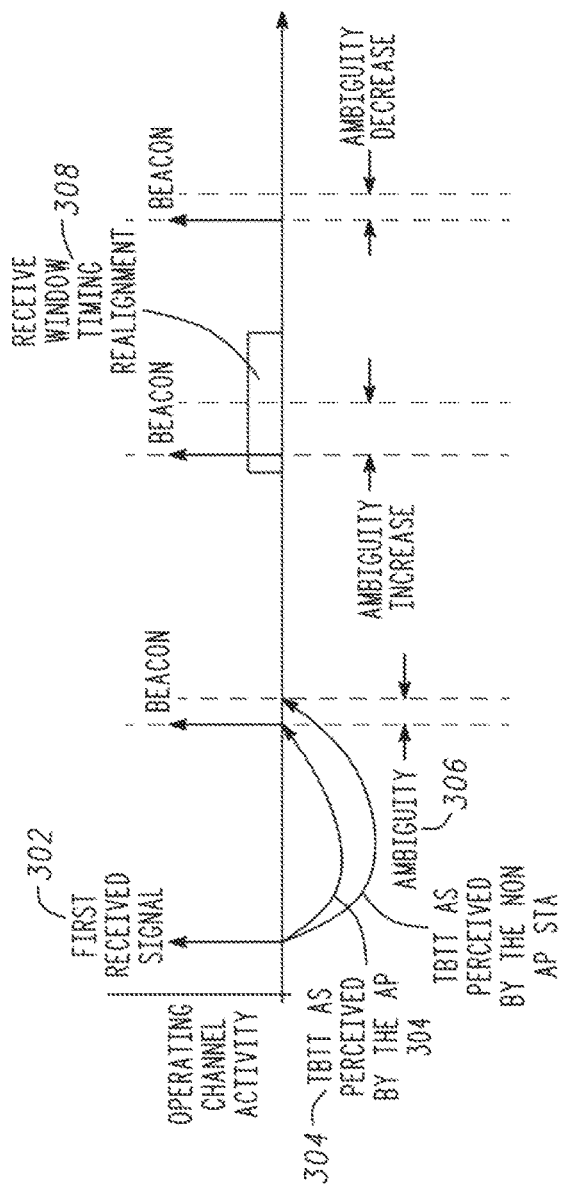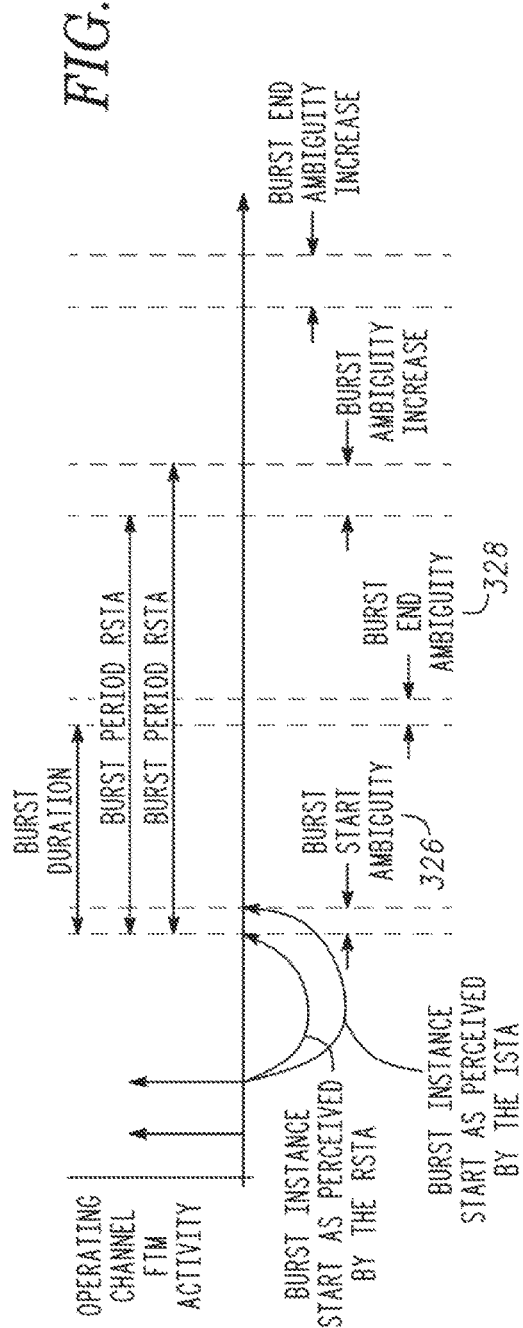

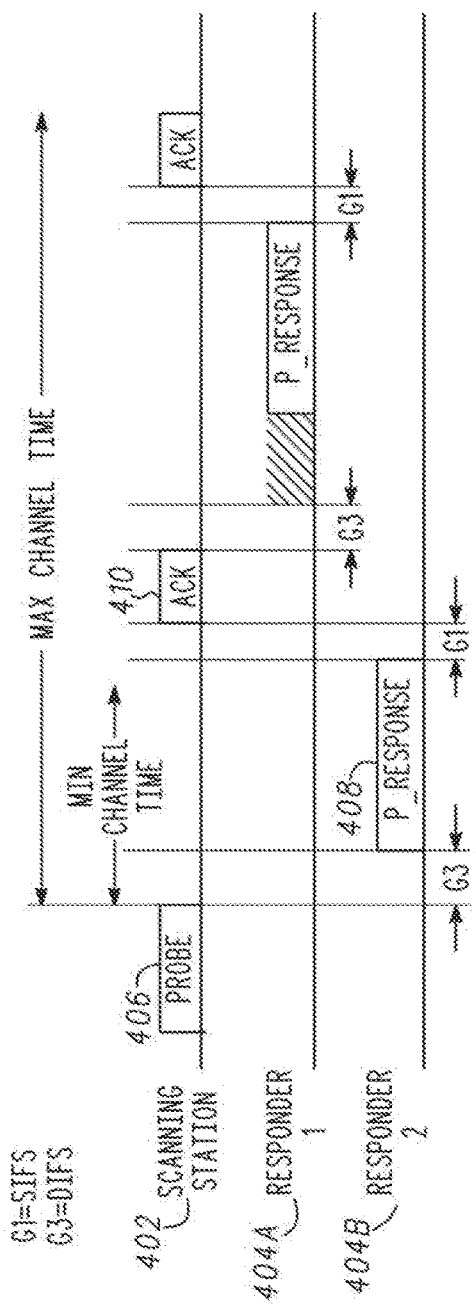

FIG. 7A

| ELEMENT ID | LENGTH | ELEMENT ID EXTENSION | TSF SYNC INFO 702 |
|---|---|---|---|
| 1 | 1 | 1 | 4 |

OCTETS

| CATAGORY | PUBLIC ACTION | DIALOG TOKEN | FOLLOW UP DIALOG TOKEN | TOD | TOA |
|---|---|---|---|---|---|
| 1 | 1 | 1 | 1 | 6 | 6 |

OCTETS

| TOD ERROR | TOA ERROR | FTM SYNCHRONIZATION INFORMATION (OPTIONAL) | LCI REPORT (OPTIONAL) | LOCATION CIVIC REPORT (OPTIONAL) | FINE TIMING MEASUREMENT PARAMETERS (OPTIONAL) |
|---|---|---|---|---|---|
| 2 | 2 | 0 OR 8 | VARIABLE | VARIABLE | VARIABLE |

OCTETS

US 9,999,010 B2

SYSTEM AND METHODS OF TIME SYNCHRONIZATION BETWEEN WIRELESSLY CONNECTED DEVICES

PRIORITY CLAIM

This application claims the benefit of priority to U.S. Provisional Patent Application Ser. No. 62/165,075, filed May 21, 2015, and entitled "SYSTEM AND METHODS OF TIME SYNCHRONIZATION BETWEEN WIRELESSLY CONNECTED DEVICES," which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group (SG) (High Efficiency Wireless (HEW)). Some embodiments relate to location detection using passive and/or active scanning of stations (STAs) and access points (APs) serving the STAs.

BACKGROUND

With the increase in different types of mobile STAs communicating over networks to servers and other computing devices, usage of IEEE 802.11 networks, as well as other types of networks such as 3rd Generation Partnership Project (3GPP) Long-Term Evolution (LTE) systems has increased. In particular, the use of location detection has increased dramatically in an attempt to deliver goods and services and to provide marketing such as local advertisements about goods and services to the STAs. Location detection may also be used in STA tracking (e.g. asset tracking) as well as a number of other applications. The varieties of STAs include typical STAs, such as cell phones, and Machine Type Communications (MTC) STAs, which have exploded in popularity as part of the Internet of Things (IoT). MTC STAs may pose a particular challenge in a number of circumstances as they may be low cost, low complexity and low power, leading to a host of communication issues. Examples of such MTC STAs include sensors (e.g., sensing environmental conditions) or microcontrollers in appliances or vending machines.

Each STA may periodically time synchronize to an AP to which it is attached using either an active scan by sending a probe or a passive process by scanning for one or more beacon frames. Either of these processes, however, may expend a considerable amount of power. Such power considerations may be further exacerbated in location determination of the STAs through the use of trilateration, as time synchronization may be performed by the STA for more than one AP. It would thus be desirable to provide a more power efficient method of time synchronization in STAs.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIGS. 3A and 3B illustrate timing ambiguity changes in accordance with some embodiments.

FIG. 4 illustrates an active scan technique in accordance with some embodiments.

FIG. 6 illustrates fields in a FTM parameter in a FTM response frame in accordance with some embodiments.

FIGS. 7A and 7B illustrate an FTM information element and a FTM response frame respectively in accordance with some embodiments.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
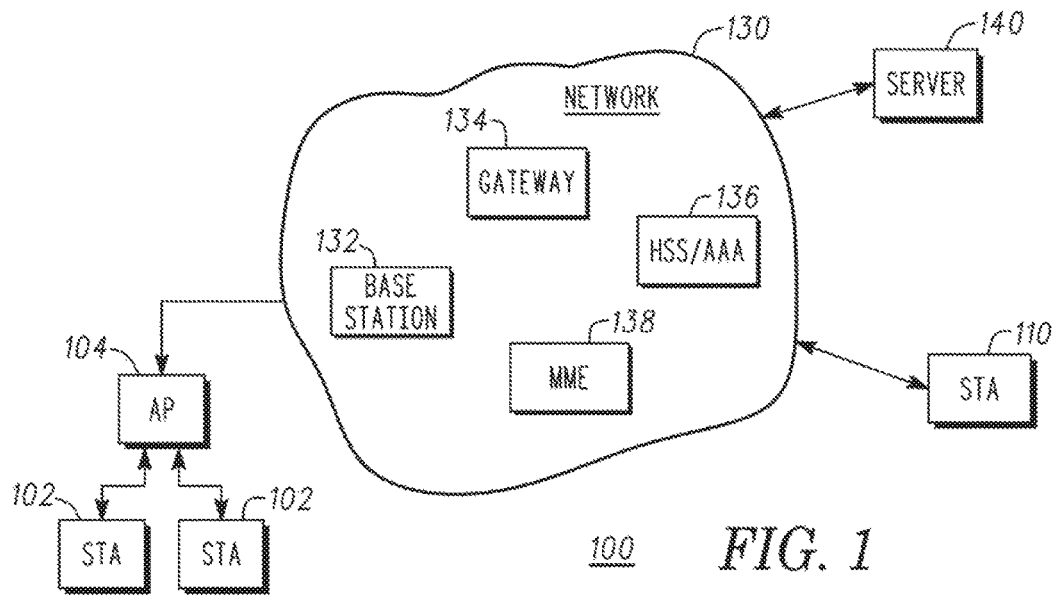
FIG. 1 illustrates a wireless network in accordance with some embodiments.

FIG. 1 illustrates a wireless network in accordance with some embodiments. In some embodiments, the network 100 may include an IEEE 802.11 network (using an IEEE 802.11a/b/g/n/ac or ax protocol) such as a Wireless Local Area Network (WLAN) or a Wi-Fi network. The network 100 may include a Basic Service Set (BSS) comprising one or more stations (STAs) 101 and one or more access points (APs) 103. The STAs 102 may be a wireless communication device, such as a personal digital assistant (PDA), a laptop or portable computer with wireless communication capability, a tablet computer, a cellphone, a smartphone, a wireless headset, a pager, an instant messaging device, a digital camera, a television, a medical device (e.g., a heart rate monitor, a blood pressure monitor, etc.), a wearable device, a MTC device (e.g., sensor) or other device that may receive and/or transmit information wirelessly. The STAs 102 may be in communication with the AP 104 and may include, for example, legacy STAs or High Efficiency WLAN (HEW) STAs, master STAs and user STAs for HEW transmissions. The AP 104 and STAs 102 may communicate during a communication period in which a single device retains exclusive control of the wireless medium over a transmission opportunity (TXOP)). The communication period may include either or both a contention period, in which each of the STAs 102 and AP 104 may contend for the wireless medium or a non-contention period, in which a particular device may be scheduled for uplink or downlink communications. Scheduling may be performed by the AP 104 or a master STA 102. During a contention period, for example, the IEEE 802.11 protocol may use one of a number of different types of coordination processes to avoid collision between communications of the STAs 102 and AP 104. The most common contention processes include the Distributed Coordination Function (DCF), in which the devices contend to gain access to the wireless medium without support for quality of service (QoS), and the Hybrid Coordination Function (HCF), which supports prioritized contention-based QoS services, and uses an Enhanced Distributed Coordination Access (EDCA) method. During a non-contention period, a master-sync or control signal may be transmitted at the beginning of the period to indicate, among other things, which STAs 102 are scheduled for communication during the period.

In some embodiments, the AP 104 may transmit a spatial modulation orthogonal frequency division multiplexing (SM-OFDM) signal that comprises multiple OFDM signals, and the SM-OFDM signal may be received at the STA 102. The SM-OFDM signal may be transmitted in channel resources that comprise one or more sub-carriers and the OFDM signals may be based at least partly on data symbols for used data portions of the sub-carriers. In some embodiments, the multiple-access technique used during the communication period may be a scheduled orthogonal frequency division multiple access (OFDMA) technique. This may allow multiple STAs 102 to simultaneously communicate uplink and downlink data and control signals with the AP 104. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the communication period may be configured for uplink or downlink data communications.

In some embodiments, the IEEE 802.11 communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel of a communication may be configured for transmitting a number of spatial streams.

To enable multi-user MIMO transmissions, it may be desirable for the preamble to be able to describe a number of spatial streams and enable multiple STAs to set up to receive the frames. The fields of the physical layer frame of IEEE 802.11 transmissions may include a Non-HT Short Training Field (L-STF) and Non-HT Long Training Field (L-LTF), a Non-HT Signal Field (L-SIG), VHT Signal A (VHT-SIG-A) and Signal B (VHT-SIG-B) Fields, a VHT Short Training Field (VHT-STF), a VHT Long Training Field (VHT-LTF), and a Data Field. The Non-HT Short Training Field (L-STF) and Non-HT Long Training Field (L-LTF) may contain OFDM symbols used to assist a STA in identifying that an 802.11 frame is about to start, synchronizing timers, and selecting an antenna. The Non-HT Signal Field (L-SIG) may be used to describe the data rate and length (in bytes) of the frame, which is used by STAs to calculate the time duration of the frame's transmission. The VHT Signal A (VHT-SIG-A) and Signal B (VHT-SIG-B) Fields may describe the included frame attributes such as the channel width, modulation and coding, and whether the frame is a single- or multi-user frame. The VHT Short Training Field (VHT-STF) may be used to assist a STA in detecting a repeating pattern and setting receiver gain. The VHT Long Training Field (VHT-LTF) may be used to set up demodulation of the rest of the frame, starting with the VHT Signal B field, and may be used for channel estimation. The Data field may contain a higher-layer protocol packet, an aggregate frame containing multiple higher-layer packets, or, is used by the VHT PHY for beamforming setup, measurement, and tuning if no Data field is present in the physical layer payload.

The Signal Fields help the STA decode the data payload, which is done by describing the parameters used for transmission. The SIG-A field is received identically by all receivers while the SIG-B field is different for each multi-user receiver. The SIG-A field may include, among others, information about the channel bandwidth, a Group ID enabling a STA to determine whether the data payload is single- or multi-user, the modulation and coding scheme (MCS), etc. . . . . The VHT SIG-B field may be used to set up the data rate, as well as tune in MIMO reception. The VHT SIG-B field may be transmitted in a single OFDM symbol, so that different lengths (26, 27 or 29 bits) may be used depending on the channel width. The VHT SIG-B Length (17, 19, or 21 bits) may measure the length of the Data field payload of the physical layer frame, in four-byte units. This field may vary in size so that the maximum value of the field is approximately constant. Reserved bits (2 or 3 bits) between the length field and the tail are reserved, and Tail bits (6 bits) that may allow a convolutional coder to complete.

As shown in FIG. 1, the STAs 102 may communicate with one or more other STAs 110 and/or one or more servers 140 through the AP 104 and/or one or more networks 130. The STAs 102 and AP 104 may communicate through the networks 130 via Third Generation Partnership Project Long Term Evolution (3GPP LTE) networks and LTE advanced (LTE-A) networks, $4^{th}$ generation (4G) networks or $5^{th}$ generation (5G) networks. The server 140 may, for example, provide audio and/or video content or support for applications running on the STAs 102.

The network 130 may have all of the features, hardware, and systems of networks, however, only a few elements in the network 130 are shown for exemplary purposes. The network may contain a base station (which may be e.g., an enhanced NodeB or eNB) 132, a gateway 134 (serving and/or home gateway), a Home Subscriber Server (HSS) 136, and a Mobility Management Entity (MME) 138, among others. The base station 132 may provide the initial point of connection to the network 130 by each STA 102 and AP 104. The HSS 136 may be a database of user (subscriber) information, i.e., customer profiles and provide authentication for use of the network 130 by a particular STA 102 or AP 104. The user information may include account information, account status, user preferences, features subscribed to by the user, user's current location, and allowable APNs. The HSS 136 may provide the user profile to a Mobility Management Entity (MME) 138, which may control network access of the STAs 102 and AP 104 through the gateway 134. The network 130 may also contain various servers that provide content or other information related to user accounts.

Figure 2:
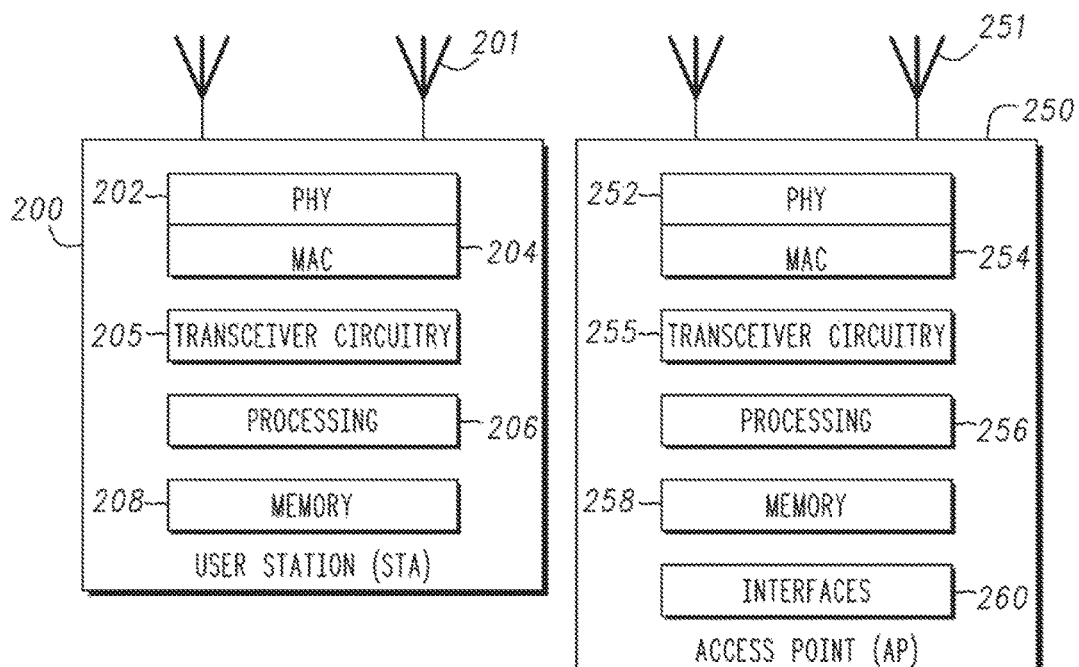
FIG. 2 illustrates a STA and an AP in accordance with some embodiments

FIG. 2 illustrates a STA and an AP in accordance with some embodiments. In some embodiments, the AP may be a stationary non-mobile device. The STA 200 may be suitable for use as a STA 102 as depicted in FIG. 1, while the AP 250 may be suitable for use as an AP 104 as depicted in FIG. 1.

The STA 200 may include physical layer circuitry 202 and a transceiver 205, one or both of which may enable transmission and reception of signals to and from the AP 250, other APs, other STAs or other devices using one or more antennas 201. As an example, the physical layer circuitry 202 may perform various encoding and decoding functions that may include formation of baseband signals for transmission and decoding of received signals. As another example, the transceiver 205 may perform various transmission and reception functions such as conversion of signals between a baseband range and a Radio Frequency (RF) range. Accordingly, the physical layer circuitry 202 and the transceiver 205 may be separate components or may be part of a combined component. In addition, some of the described functionality related to transmission and reception of signals may be performed by a combination that may include one, any or all of the physical layer circuitry 202, the transceiver 205, and other components or layers.

The AP 250 may include physical layer circuitry 252 and a transceiver 255, one or both of which may enable transmission and reception for transmission and reception of signals to and from the STA 200, other APs, other STAs or other devices using one or more antennas 251. The physical layer circuitry 252 and the transceiver 255 may perform various functions similar to those described regarding the STA 200 previously. Accordingly, the physical layer circuitry 252 and the transceiver 255 may be separate components or may be part of a combined component. In addition, some of the described functionality related to transmission and reception of signals may be performed by a combination that may include one, any or all of the physical layer circuitry 252, the transceiver 255, and other components or layers.

The STA 200 may also include medium access control layer (MAC) circuitry 204 for controlling access to the wireless medium, while the AP 250 may also include medium access control layer (MAC) circuitry 254 for controlling access to the wireless medium. The STA 200 may also include processing circuitry 206 and memory 208 arranged to perform the operations described herein. The AP 250 may also include processing circuitry 256 and memory 258 arranged to perform the operations described herein. The AP 250 may also include one or more interfaces 260, which may enable communication with other components, including other APs 102 (FIG. 1). In addition, the interfaces 260 may enable communication with other components that may not be shown in FIG. 1, including components external to the network 100. The interfaces 260 may be wired or wireless or a combination thereof.

The antennas 201, 251 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 251 may be effectively separated to take advantage of spatial diversity and the different channel characteristics that may result.

In some embodiments, the STA 200 or the AP 250 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 200 or AP 250 may be configured to operate in accordance with 802.11 standards, although the scope of the embodiments is not limited in this respect. Mobile devices or other devices in some embodiments may be configured to operate according to other protocols or standards, including other IEEE standards, 3GPP standards or other standards. In some embodiments, the STA 200, AP 250 or other device may include one or more of a keyboard, a display, a non-volatile memory port, multiple antennas, a graphics processor, an application processor, speakers, and other mobile device elements. The display may be an LCD screen including a touch screen.

Although the STA 200 and the AP 250 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

It should be noted that in some embodiments, an apparatus used by the STA 200 and/or AP 250 may include various components of the STA 200 and/or AP 250 as shown in FIG. 2. Accordingly, techniques and operations described herein that refer to the STA 200 (or 103 or 104) may be applicable to an apparatus for an STA. In addition, techniques and operations described herein that refer to the AP 250 (or 102) may be applicable to an apparatus for an AP.

In some embodiments, the STA 200 may communicate using OFDM communication signals over a multicarrier communication channel. Accordingly, in some cases the STA 200 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the invention is not limited in this respect as they may also be suitable to transmit and/or receive communications in accordance with other techniques and standards. In some other embodiments, the STA 200 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In accordance with embodiments, the AP 104 may transmit an SM-OFDM signal that comprises multiple OFDM signals, and the SM-OFDM signal may be received at the STA 103. The SM-OFDM signal may be transmitted in channel resources that comprise multiple sub-carriers and the OFDM signals may be based at least partly on data symbols for used data portions of the sub-carriers. The used data portions may be based on a first portion of encoded bits and the data symbols for the used data portions may be based on a second portion of the encoded bits. In some examples, the used data portions of the sub-carriers may be different for at least some of the OFDM signals. These embodiments will be described in more detail below.

In some embodiments, the channel resources may be used for downlink transmission by the AP 104 and for uplink transmissions by the STAs 102. That is, a time-division duplex (TDD) format may be used. In some cases, the channel resources may include multiple channels, such as the 20 MHz channels previously described. The channels may include multiple sub-channels or may be divided into multiple sub-channels for the uplink transmissions to accommodate multiple access for multiple STAs 102. The downlink transmissions may or may not utilize the same format.

In some embodiments, the downlink sub-channels may comprise a predetermined bandwidth. As a non-limiting example, the sub-channels may each span 2.03125 MHz, the channel may span 20 MHz, and the channel may include eight or nine sub-channels. Although reference may be made to a sub-channel of 2.03125 MHz for illustrative purposes, embodiments are not limited to this example value, and any suitable frequency span for the sub-channels may be used. In some embodiments, the frequency span for the sub-channel may be based on a value included in an 802.11 standard (such as 802.11ax), a 3GPP standard or other standard.

In some embodiments, the sub-channels may comprise multiple sub-carriers. Although not limited as such, the sub-carriers may be used for transmission and/or reception of OFDM or OFDMA signals. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases. As an example, for a 78.125 kHz sub-carrier spacing, a sub-channel may comprise 26 contiguous sub-carriers or a bandwidth of 2.03125 MHz.

As above, the STA communicate with one or more APs. In some embodiments, the STA may employ different channels to communicate with the different APs. Besides obtaining user data from the APs, the AP may obtain concurrent location information from the APs in a TDD manner. In general, a number of techniques exist to finding the location of a STA in a network. Among these, although use of Global Positioning System (GPS) signals is extremely popular, in some circumstances, GPS is unavailable or supplementary techniques are desired. For example, as GPS uses satellite fixes for positioning, in some circumstances such as when the STA is indoors or underground the STA may be unable to receive a positioning signal from one or more of the satellites used for the position fix. One of the alternate or supplementary techniques may include a determination of either or both the one way or round trip time of a beacon frame or another frame from at least one known location (such as a position of a fixed AP) to at least one unknown location. The use of several known locations may permit location detection via trilateration.

The STA may time synchronize to the different APs using either an active process by sending a probe or a passive process by scanning for one or more beacon frames. While the response to the probe may contain timing information, transmission of the probe request and staying awake for the probe response may consume a significant amount of power. Conversely, transmission by the STA in passive mode is not employed. Instead, the STA may stay awake for an amount of time longer than a beacon frame interval to guarantee receipt of a beacon frame, which may accordingly consume a significant amount of power (but less than the active scan).

A beacon frame associated with a particular WLAN may comprise a frame header, a body comprising communication information and cyclic redundancy checking (CRC) field. The header may include source and destination Medium Access Control (MAC) addresses, among other information. The destination address may be set to all 1s, which is the broadcast MAC address, so that all other STAs using the applicable channel receive and process each beacon frame. The communication information may include a timestamp, a beacon interval, a Service Set Identifier (SSID), transmission rates supported by the WLAN, parameter sets, capability information, and Traffic Indication Map (TIM). The timestamp may be used to update the local clock at each responding STA to enable synchronization of the STAs associated with the same BSSID or IBSSID. The beacon interval may indicate the time between beacon transmissions. The SSID may identify a WLAN. The parameter sets may indicate the signaling methods used by the WLAN (such as frequency hopping spread spectrum or direct sequence spread spectrum) as well as the parameters used by the signaling methods, such as hopping pattern and dwell time. The capability information may provide station requirements (such as security requirements) to belong to the WLAN. The TIM may identify which STAs using power saving mode have data frames waiting for them in the AP buffer, if the beacon frame is sent from the AP.

In some embodiments, such as ad hoc (IBSS) networks in which APs are not present, one of the STAs may transmit a beacon frame. After receiving a beacon frame, each STA may wait for the beacon interval and, if no other STA sends a beacon, after a random time delay that is different for each STA subsequently send a beacon. This ensures that at least one STA sends a beacon. The random delay may distribute the responsibility for sending beacons amongst the STAs of the IBSS. All stations in the BSS or IBSS may use a common value, aBeaconPeriod, which defines the length of beacon intervals/period. This value, which may be established by the AP or STA that initiates the BSS/IBSS, may define a series of Target Beacon Transmission Times (TBTTs) exactly aBeaconPeriod time units apart. Time zero may be defined to be a TBTT.

As above, in many network deployments multiple APs may be present. The operating channel of each of these APs may extend over multiple channels, with different APs transmitting over the same or different sets of channels. In this case, the STA may select a channel of each AP with the strongest signal or signal-to-noise ratio. In some embodiments, data and timing for a particular AP may be provided over the same channel, while in other embodiments, data may be provided over one channel and timing synchronization over another channel. If the STA has an on-going data exchange (e.g., to retrieve location contextual information such as maps or to continue a VoIP call), the data link performance may be reduced as the STA may be forced to vacate the associated AP operational channel to permit active or passive scan to occur.

In some embodiments, Fine Timing Management (FTM) may be used for a distance, and consequently location, measurement. IEEE 802.11 REVmc D4.0 defines a FTM protocol in which the timing resolution may be able to achieve 100 ps. Using FTM, the AP may allocate one or more time windows derived from the Time Synchronization Function (TSF) of the AP. Based on the IEEE 802.11 standard, every 802.11 device has a TSF counter or value. The TSF value may keep the timers for all members in the same BSS (the STAs and APs) synchronized to correct time drift introduced by hardware time drift and timekeeping imprecision among members of the BSS. This is to say that the STA may use an internal clock to provide timing. STA clocks may, however, be prone to drift from the system (AP) clock. The amount of drift may, in some embodiments, become more pronounced if the STA synchronization is distance dependent, i.e., receiving beacon frames less frequently with increasing distance from a particular AP. If the beacon frame is fairly infrequent and the STA drifts from synchronization with the AP, the STA may not be able to act correctly on a FTM allocation provided by the AP. As the FTM allocation may also be periodically repeating and multiple periods may occur between adjacent beacon frames, if the STA is unable to synchronize and realign its local TSF with the TSF of the AP, the STA and AP may drift apart by as much as 200 ppm. The use of TSF values in combination with the below may avoid this through continual synchronization to the different APs and permit functionality such as location determination via triangulation to be accurate.

Thus, in some embodiments, during the allocated time window of the FTM procedure, the STA may request allocation for channel resources from the AP using a FTM request frame and may receive a grant of allocation (burst duration) in response. In some embodiments, the during the allocated time window of the FTM procedure, the STA may indicate its availability to the AP using a FTM trigger frame. To be able to correctly act on the FTM allocation as directed by the AP, it may be desirable for the STA to be synchronized to the AP using the response to either an FTM request frame or FTM trigger frame.

It would thus be desirable to enable synchronization of STAs without the STAs engaging in passive or active scan processes to retrieve timing information from the AP, thereby reducing the power and channel usage during synchronization. Not only is this desirable to MTC and other low-power STAs, but may be useful in addition, for unassociated STAs. Unassociated STAs may not be associated with the particular BSS and thus may not receive any regular or delivery traffic indication map (DTIM) beacons from the AP. Synchronization using a modified FTM procedure may enable the STA to be available for the associated AP for longer durations channel movement for synchronization may be avoided.

A method is described herein that may enable retrieval by the STA of a TSF (such as an AP TSF) without the TSF being provided in response to an active probe or the STA being available specifically for the AP beacon frames. In some embodiments, the STA may use active scanning without the STA transmitting a time-critical message. In some embodiments, a message transmitted by the STA may contain content that is dependent on the transmission time. In such embodiments, the STA may determine synchronization based on the content, rather than, or in addition to, the timestamp of the message alone.

FIGS. 3A and 3B illustrate timing ambiguity changes in accordance with some embodiments. As above, in a passive scan a beacon having a timestamp is transmitted by an AP and received by a STA. As shown in FIG. 3A, beacons 302 are transmitted periodically. The TBTT 304 may have an associated ambiguity 306 due to a drift between the unsynchronized STA TSF and the AP TSF. This ambiguity may increase with increasing time until synchronization occurs. The STA may periodically receive synchronization information from the AP to realign the STA TSF during a Receive Window Timing Realignment period 308 and decrease the ambiguity.

In FIG. 3B, initiating STA (ISTA) may transmit a FTM request, which may be received by a responding STA (RSTA). The responding STA may be an AP or another STA. The responding STA may indicate to the initiating STA in a specific burst instance, a burst duration over which the responding STA and the initiating STA may communicate, with each burst duration occurring within a burst period. The ambiguity 326, 328 between the start of a burst instance may increase with increasing time until synchronization occurs.

FIG. 4 illustrates an active scan technique in accordance with some embodiments. As above, in an active scan, a beacon frame (or probe 406) is transmitted by a scanning STA 402 and received by responders 404a, 404b. The responders 404a, 404b may be one or more other STAs and/or APs. As shown, the responders 404a, 404b may provide a response between a minimum and maximum channel time response. After a minimum Distributed Coordination Function Inter Frame Space (DIFS) period, one of the responders 404b may transmit a probe response to the scanning STA 402. The scanning STA 402, in response to receiving a response 408 from the responder 404b, may provide an acknowledgment (ACK) 410 to the responder 404b after a Short Inter Frame Space (SIFS) period. The active scan technique may be used for determining one-way or round trip measurement times between the STA and other BSS or IBSS members.

Figure 5:
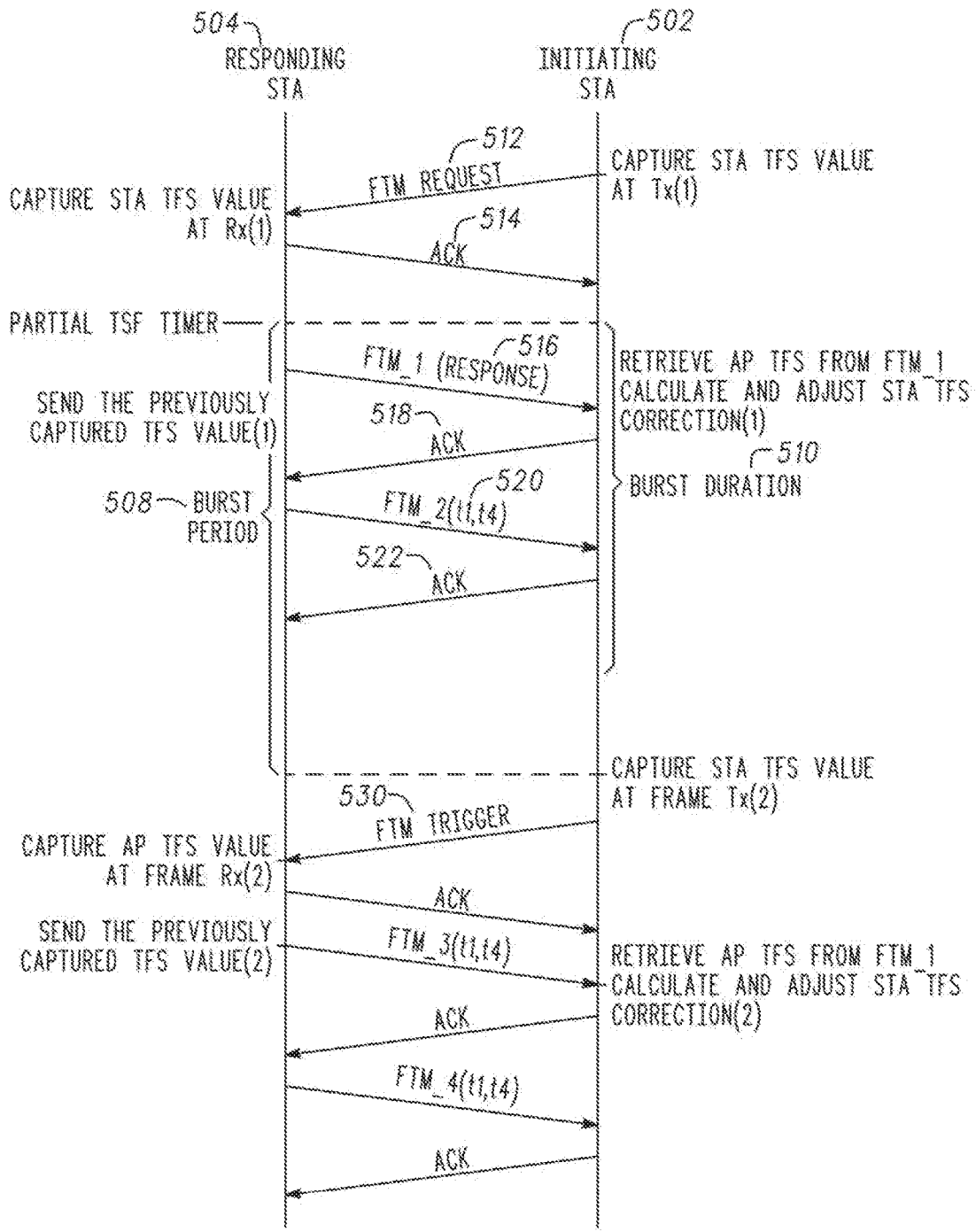
FIG. 5 illustrates a Fine Timing Measurement (FTM) procedure in accordance with some embodiments.

FIG. 5 illustrates an FTM procedure in accordance with some embodiments. FIG. 5 shows communications between an initiating STA 502 and a responding STA 504. The responding STA 504 may be, for example, an AP, as indicated in FIG. 5. Each of the initiating STA 502 and responding STA 504 may have its own respective local TSF value indicating the time at which communications are respectively transmitted and received.

The initiating STA 502 may start the process by initiating an FTM communication or transmission frame. To accomplish this, the initiating STA 502 may capture a TSF value and transmit an FTM request frame 512 to the responding STA 504. The TSF value captured may be the TSF value when the FTM request frame 512 is transmitted. The FTM request may or may not contain the captured TSF value.

FIG. 6 illustrates fields in of a FTM parameter in a FTM response frame in accordance with some embodiments. The term FTM response frame is used herein to refer to an FTM frame that is used a response to the FTM request. The FTM frame may, in other circumstances, be used to provide fine timing measurement information. The FTM parameters 600 may comprise, among other fields, a partial TSF timer field 602, a FTMs per burst field 604 and FTM request frame TSF value field 606. The FTM request frame TSF field 602 may contain the AP TSF value at the reception of the last acknowledged (i.e., correctly received) FTM request frame. The FTM request frame TSF value field 606 may also provide only part of the AP TSF value (a 64 byte value). In some embodiments, the FTM request frame TSF value field 606 may take the place of a reserved field in a FTM response frame that does not contain the FTM request frame TSF value field 606. In some embodiments, the FTM request frame TSF value field 606 may be an additional field rather than replacing an existing field in a parameter of a FTM response frame.

FIGS. 7A and 7B illustrate an FTM information element and a FTM response frame respectively in accordance with some embodiments. The Element ID, Length and Element ID Extension fields may be defined in 3GPP Technical Specification 8.4.2.1. The Element ID and Element ID of the TSF information element 700 may signal that the information element is a FTM information element. The TSF Sync Info field 702 of the TSF information element 700 may provide the four least significant bytes of the AP TSF value at the reception of the last acknowledged (i.e., correctly received) FTM request frame. In some embodiments, the length of the TSF information element 700 may be 7 bytes. In some embodiments, the TSF information element 700 may be an additional information element rather than replacing an existing information element of a FTM response frame.

The format of the FTM response frame 710 is used to support the FTM procedure. In some embodiments, the FTM Synchronization Information field 712 may be present in the initial FTM response frame and its retransmissions. In some embodiments, the FTM Synchronization Information field 712 may be present in the first FTM response frame within each burst and its retransmissions. If present, the FTM Synchronization Information field 712 may contain the FTM Synchronization Information element 700 with a TSF Sync Info field 702 containing the 4 least significant bytes of the TSF value at the responding STA corresponding to when the responding STA received the last FTM Request frame with the Trigger field set to 1. In some embodiments, the length of the FTM Synchronization Information field 712 may be 0 bytes (not present) or 7 bytes (present).

Turning back to FIG. 5, the responding STA 504, in response to receiving the FTM request frame 512, may capture the TSF value of the responding STA 504 (shown as AP TSF value). The AP TSF value may be captured at the time that the FTM request frame 512 is received by the responding STA 504. Also in response to receiving the FTM request frame 512 the responding STA 504 may transmit an ACK signal 514 to the initiating STA 502. The responding STA 504 may transmit the ACK signal 514 immediately to the initiating STA 502 or may wait for a first predetermined period, such as a SIFS interval, prior to transmitting the ACK signal 514, where the first predetermined period is known to the initiating STA 504. In some embodiments, the ACK signal 514 may not contain the AP TSF value.

After transmitting the ACK, the responding STA 504 may also transmit to the initiating STA 502 the first FTM response frame 516 of a series of FTM response frames over a burst duration 510. The number of FTM response frames transmitted by the responding STA 504 may be set by the FTMs per Burst field in the FTM request frame 512 shown in FIG. 6. More specifically, the FTMs per Burst field in the FTM request frame 512 may indicate how many successfully transmitted FTM response frames are requested by the initiating STA 502 to be provided by the responding STA 504, or are allocated by the FTM request frame 512 by the responding STA 504. The responding STA may transmit an indication in an indication frame to the initiating STA of the previously captured TSF value associated with the received FTM request frame.

The FTM response frame 516 may include the AP TSF value captured when the FTM request frame 512 was received by the responding STA 504. The responding STA 504 may transmit the FTM response frame 516 at a first burst instance, at which point a partial TSF timer may be established as the initiating STA 504 has not received the AP TSF value. After termination of the burst duration 510, the responding STA 504 may wait for a burst period 508 prior to responding to the next message from the initiating STA 502.

The responding STA 504 may count up or down to a predetermined value before the initial FTM response 516 and/or between FTM responses prior to transmission such that a predetermined minimum time elapses between reception of a signal from the initiating STA 502 and transmission of the burst from the responding STA 504. The FTM response frames may be transmitted semi-periodically, with the periodicity varying dependent on whether or not a particular FTM response frame is acknowledged by the initiating STA 502.

As above, the FTM request frame 512 may include both a FTMs per Burst field and a maximum time field such that the burst duration does not exceed a maximum amount of time independent of the number of successfully received FTM response frames. In some embodiments, the time difference between transmission of the FTM request frame 512 and reception of the FTM response frame 516 by the initiating STA 502 may not exceed a maximum time limit, such as 10 ms. In some embodiments, the time difference between consecutive FTM response frames may be between several tens of µs and 25.5 ms The initiating STA 502 may, upon receiving the FTM response frame 516, extract the AP TSF value from the FTM response frame 516. The AP TSF value may be compared to the TSF value transmitted by the initiating STA 502 in the FTM request frame 512. The initiating STA 502 may calculate a TSF correction and set the STA TSF value using the TSF correction assuming either that the initiating STA 502 has knowledge of the one-way or round trip transmission time between the initiating STA 502 and the responding STA 504 or that the transit time is minimal (as the values are accurate to ms and the transit time over 30 meters is 0.1 µs). The initiating STA 502 may, also in response to receiving the FTM response frame 516, transmit a first ACK signal 518 of a series of ACK signals to the responding STA 504. The initiating STA 502 may transmit the first ACK signal 518 immediately to the responding STA 502 or, as above, wait a predetermined period, such as a SIFS or DIFS interval, prior to transmitting the first ACK signal 518.

The responding STA 504, after receiving the first ACK signal 518 may transmit a second FTM response frame 520 to the initiating STA 502. The second FTM response frame 520 may be transmitted at a second burst instance. The responding STA 504 may transmit the second FTM response frame 520 in response to receiving the first ACK signal 518 or in response to a preset transmission period elapsing. In some embodiments, the responding STA 504 may capture the first ACK TSF value (corresponding essentially to transmission of second AP TSF value) and/or determine the time difference between the first ACK TSF value and the AP TSF value. The second FTM response frame 520 may contain one or more of the AP TSF value, the first ACK TSF value, and the time difference between the first ACK TSF value and the AP TSF value.

The initiating STA 502 may, upon receiving the second FTM response frame 520, extract one or more of the AP TSF value, first ACK TSF value, and the time difference between the first ACK TSF value and the AP TSF value from the second FTM response frame 520. The extracted TSF value(s) may be used to set the STA TSF value or confirm a previous adjustment. In some embodiments, the extracted TSF value(s) may be used to estimate a drift/time and trigger an alert (e.g., transmission to a network entity or user alert) if it exceeds a predetermined value. The initiating STA 502 may, also in response to receiving the second FTM response frame 520, transmit a second ACK signal 522 to the responding STA 504.

The responding STA 504 may continue throughout the burst duration 510 to transmit FTM response frames containing the appropriate timing value(s) above in response to receiving an associated ACK signal or in response to a preset transmission period from the last FTM response frame transmission elapsing at the associated burst instance. The initiating STA 502 may similarly transmit ACK signals in response to receiving an associated FTM response frame and calculate and adjust the STA TSF accordingly.

The initiating STA 502 may calculate the TSF correction and subsequently determine its location using the TSF correction using some or all of the FTM response frames of the burst duration, under the assumption that the network conditions (and thus transmission time) does not vary significantly over the burst duration. For example, the time offset may be determined to be one half of the combination of the difference between the TSF value when a particular FTM response frame was received and the AP TSF value when the particular FTM response frame was transmitted less the difference between the AP TSF value when the corresponding ACK signal was received and the TSF value when the corresponding ACK signal was transmitted. If multiple FTM response frames and corresponding ACKs are used, the average time offset may be calculated from the individual time offsets and used as the overall time offset. In some embodiments, the STA TSF value may be adjusted dependent on a moving average of differences between consecutive adjustments based on consecutive AP TSF values. Note that although only one responding STA 504 is shown in FIG. 5, in some embodiments the initiating STA 502 may communicate with a plurality of responding STAs 504.

The FTM procedure for an FTM trigger frame 530 from the initiating STA 502 is similar. The initiating STA 502 may capture a TSF value when the FTM trigger frame 530 is transmitted. The responding STA 504, in response to receiving the FTM trigger frame 530, may capture the TSF value and transmit an ACK signal to the initiating STA 502. After transmitting the ACK signal, the responding STA 504 may also transmit FTM response frames to the initiating STA 502. One or more of the FTM response frames may include the AP TSF value captured when the FTM trigger frame 530 was received by the responding STA 504. The initiating STA 502 may calculate a TSF correction based on the difference between the AP TSF value and the STA TSF value and set the STA TSF value using the TSF correction. The calculation and STA TSF value adjustment may occur over the course of the burst duration associated with the FTM trigger 530 in a manner similar to that described above.

Figure 8:
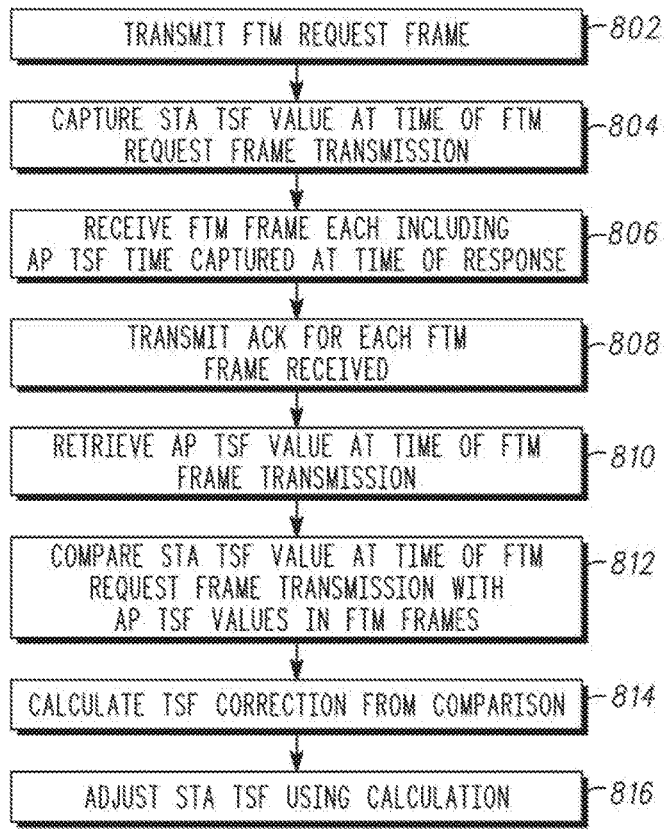
FIG. 8 illustrates a flowchart of a method of synchronizing an STA in accordance with some embodiments.
Figure 9:
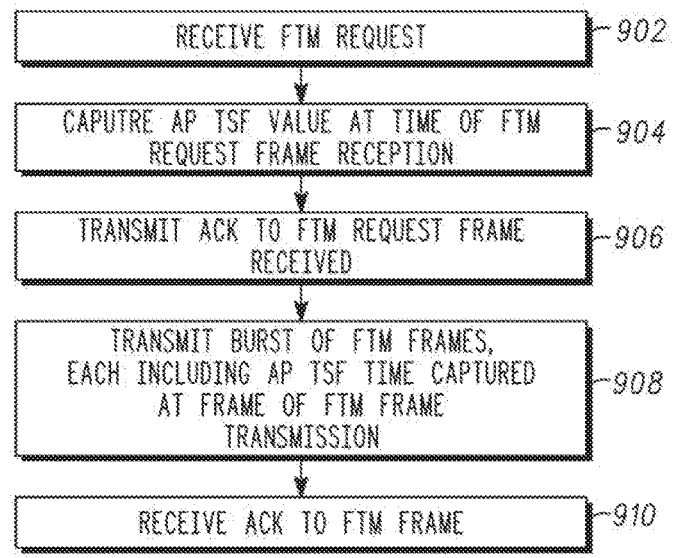
FIG. 9 illustrates a flowchart of a method of providing synchronization information in accordance with some embodiments.

FIG. 8 illustrates a flowchart of a method of synchronizing an STA in accordance with some embodiments. FIG. 9 illustrates a flowchart of a method of providing synchronization information in accordance with some embodiments. In particular, FIG. 8 may illustrate functionality of the initiating STA and FIG. 9 may illustrate functionality of the responding STA. The methods shown in FIGS. 8 and 9 may be performed by the STA and AP shown in FIGS. 1, 2 and 5. The methods shown in FIGS. 8 and 9 may permit the STA to synchronize with one or more APs using a field or information element in a request or trigger frame and without using an active or passive scan.

At operation 802, the initiating STA may transmit a FTM request frame to one or more APs and/or STAs. In general, the request frame may be transmitted to multiple APs or STAs in a TDD manner and may enable accurate location for applications such as triangulation. The FTM request frame may comprise a new field having a FTM request frame TSF field value or a TSF Sync Info field of a new TSF information element. The FTM request frame may comprise an address field indicating the STAs and APs to which the FTM request frame is to be received. The address field may also indicate that the FTM request frame is a broadcast frame to be received by all STAs and APs.

The initiating STA, at operation 804, may capture a STA TSF value of the initiating STA at the time the FTM request frame is transmitted by the initiating STA to the STAs/APs. The STA TSF value captured may or may not be transmitted in the FTM request frame.

The FTM request frame may be transmitted over the air using any IEEE 802.11 protocol, such as IEEE 802.11 a/b/g/n/ac/ax. The FTM request frame may be received at operation 902 by the desired responding STA.

The responding STA, at operation 904, in response to receiving the FTM request frame, may capture an AP TSF value. The AP TSF value may be captured at the time that the FTM request frame is received by the responding STA.

After receiving the FTM request frame the responding STA may transmit at operation 906 an ACK signal to the initiating STA indicating successful receipt of the FTM request frame. The responding STA may transmit the ACK signal to the initiating STA immediately upon successful or wait for a first period prior to transmitting the ACK signal. The ACK signal may or may not contain the AP TSF value. If the FTM request frame was not successfully received, the responding STA may instead transmit a NACK signal to the initiating STA indicating successful receipt of the FTM request frame was not accomplished.

After transmitting the ACK signal, the responding STA may transmit at operation 908 to the initiating STA a burst of FTM response frames over a predetermined burst duration. The FTMs per Burst field in the FTM request frame may indicate how many successfully transmitted FTM response frames are requested/allocated by the initiating STA to be provided by the responding STA. The FTM response frame may include the AP TSF value captured when the FTM request frame was received by the responding STA. The responding STA may transmit a first FTM response frame at a first burst instance determined by the partial TSF timer value in the FTM request frame.

One or more of the FTM response frames may be transmitted over the air using the same IEEE 802.11 protocol as the FTM request frame. In other embodiments, the FTM response frames may be transmitted over the air using a different IEEE 802.11 protocol as the FTM request frame, but one over which the initiating STA is also able to communicate. Regardless of the protocol (IEEE 802.11 or otherwise), at operation 806 the initiating STA may receive each FTM response frame.

The initiating STA may at operation 808, in response to successfully receiving each FTM response frame, transmit an ACK signal to the responding STA. The initiating STA transmit the ACK signal immediately upon successfully receiving the corresponding FTM response frame or may wait a preset period prior to transmitting the ACK signal. The initiating STA may, in response to not successfully receiving each FTM response frame, transmit a NACK signal to the responding STA.

The responding STA may at operation 910, receive the ACK signal transmitted by the initiating STA in response to each FTM response frame. As above, the ACK and FTM response frames may be transmitted over the air using the same IEEE 802.11 protocol or over different IEEE 802.11 protocols. The responding STA, after receiving the ACK signal, may increment (or decrement) a counter. The responding STA may continue to transmit FTM response frames that are a FTM response frame period apart until the counter increments to a predetermined value. At this point, the responding STA may terminate transmission of the FTM response frames until a new FTM request or FTM trigger frame has been received. The FTM response frame period and/or predetermined value may be set by the FTM request frame.

The initiating STA may, upon receiving the FTM response frame, extract the AP TSF value from the FTM response frame at operation 810. In addition to the AP TSF value of a particular FTM response frame, the particular FTM response frame may include the initial AP TSF value or one or more of the AP TSF values of previous FTM response frames. Alternatively, a time difference between the AP TSF value of the initial or last FTM response frame and the AP TSF value of the current FTM response frame may be included.

At operation 812, the initiating STA may compare the AP TSF value transmitted by the responding STA in the FTM response frame to the STA TSF value. In embodiments in which the difference between the initial FTM response frame is transmitted by the responding STA, the initiating STA may compare the AP TSF value transmitted by the responding STA in the initial FTM response frame, adding the difference, to the STA TSF value.

At operation 814, the initiating STA may calculate a TSF correction. The calculation may be based on one or more of the comparisons between the AP TSF value and the STA TSF value. In embodiments in which the calculation is based on multiple comparisons, averaging or other weighted functions using the individual comparisons may be used to calculate the overall TSF correction.

The initiating STA may use the TSF correction to adjust the STA TSF at operation 816. The adjustment may be based on knowledge by the initiating STA of the one-way or round trip transmission time between the initiating STA and the responding STA. The one-way or round trip transmission time may be calculated using multiple comparisons. The corrected STA TSF value may subsequently be used for functionality such as triangulation. The STA TSF value may be periodically updated or updated upon an event occurring, such as powering on of the initiating STA or movement of the initiating STA to association with one or more different APs.

In some embodiments, the STA may adjust its STA TSF value based on communications with each of a plurality of APs with which the STA communicates. In some embodiments, the STA may use fewer than all the APs with which it is able to communicate to adjust its STA TSF value. In some embodiments, the STA may use a single AP to adjust its STA TSF value. The AP(s) used by the STA to adjust its STA TSF value may be the same each time the STA adjusts its STA TSF value or may change periodically, dependent, for example, on time, number of adjustments made using a particular AP and/or channel or AP characteristics. In the latter case, the STA may select the AP with the strongest SIN ratio (or closest AP) and adjust its STA TSF value using signals from only that AP.

Although not shown, the STA may communicate with a plurality of RSTAs using unicast communications with each of the RSTAs. The RSTAs may be APs and/or STAs. Each RSTA may have one or more neighbor RSTAs and maintain a TSF value for the neighbor RSTAs. The RSTA may thus be able to provide not only its own RSTA TSF value to the STA in the FTM frame, but in addition the RSTA TSF values of any number of its neighbors when the network nodes (RSTAs) are independent/have independent TSF values. This is to say that in various embodiments, the RSTA may provide all, some or none of the neighbor RSTA TSF values in the FTM frame. Each of the independent TSF values may reflect the FTM Request or FTM Trigger frame was transmitted by the STA. The STA may maintain an independent STA TSF value for each neighbor RSTA and adjust, for each neighbor RSTA, the independent STA TSF value associated with the neighbor RSTA dependent on the difference between the neighbor RSTA TSF value received in the FTM frame and the independent STA TSF value. The number of neighbor RSTA TSF values stored by the RSTA and/or provided in the FTM frame may be limited. For example, if the RSTA is a STA with limited storage, the number of neighbor RSTA TSF values stored may be limited compared to when the RSTA is an AP. In addition, if the STA is mobile and the RSTA is able to determine the direction and speed of travel, the RSTA may limit the number of RSTA TSF values in the FTM frame to RSTAs in the area toward which the STA is moving.

Example 1 is an apparatus of a station (STA) comprising: a transceiver arranged to communicate with a responding STA (RSTA); and processing circuitry arranged to: configure the transceiver to transmit to the RSTA at least one of a Fine Timing Measurement (FTM) request or FTM trigger frame; capture a Time Synchronization Function (TSF) value of the STA, the TSF being of a time the at least one of the FTM request or FTM trigger frame is transmitted to the RSTA as determined by the STA; configure the transceiver to receive from the RSTA an FTM frame in response to the RSTA receiving the at least one of the FTM request or FTM trigger frame, the FTM frame comprising an RSTA TSF value of a time the at least one of the FTM request or FTM trigger frame was transmitted by the STA; and adjust the STA TSF dependent on the difference between the RSTA TSF value and the STA TSF value to synchronize to the RSTA TSF value.

In Example 2, the subject matter of Example 1 optionally includes that the processing circuitry is further arranged to: configure the transceiver to receive an FTM request acknowledgement (ACK) signal from the RSTA indicating successful reception of the at least one of the FTM request or FTM trigger frame by the RSTA.

In Example 3, the subject matter of any one or more of Examples 1-2 optionally include that the processing circuitry is further arranged to: configure the transceiver to transmit a FTM response acknowledgement (ACK) signal to the RSTA indicating successful reception of the FTM frame by the STA.

In Example 4, the subject matter of Example 3 optionally includes that the processing circuitry is further arranged to: configure the transceiver to receive a second FTM frame from the RSTA, the second FTM frame comprising at least one of a FTM response ACK TSF value indicating the time the FTM response ACK signal was transmitted by the STA as determined by the RSTA and a time difference between the FTM response ACK TSF value and the RSTA TSF value.

In Example 5, the subject matter of Example 4 optionally includes that the processing circuitry is further arranged to: determine whether further adjustment of the STA TSF is to be performed dependent on the at least one of the FTM response ACK TSF value and the time difference and if so, adjust the STA TSF dependent on the at least one of the FTM response ACK TSF value and the time difference.

In Example 6, the subject matter of any one or more of Examples 1-5 optionally include that: the FTM frame comprises a burst duration and a burst period, the burst duration indicating a time during which a plurality of FTM responses are to be transmitted from the RSTA to the STA and the STA is to transmit to the RSTA a FTM response acknowledgement (ACK) signal in response to each received FTM response, the burst period indicating a period between adjacent burst durations, and the processing circuitry is further arranged to configure the transceiver to receive a subsequent FTM response in response to the RSTA having received a FTM response ACK signal in response to an immediately preceding FTM response.

In Example 7, the subject matter of Example 6 optionally includes that the processing circuitry is further arranged to: adjust the STA TSF dependent on a moving average of differences between consecutive RSTA TSF value adjustments.

In Example 8, the subject matter of any one or more of Examples 1-7 optionally include that: the RSTA is adjacent to a neighbor RSTA having a neighbor RSTA TSF value independent of the RSTA TSF value, and the FTM frame further comprises the neighbor RSTA TSF value of the time the at least one of the FTM Request or FTM Trigger frame was transmitted by the STA.

In Example 9, the subject matter of Example 8 optionally includes that: the RSTA is adjacent to a plurality neighbor RSTAs, the FTM frame further comprises a neighbor RSTA TSF value, for each neighbor RSTA, of the time the at least one of the FTM request or FTM trigger frame was transmitted by the STA, and the processing circuitry is further arranged to: maintain an independent STA TSF value for each neighbor RSTA, and adjust, for each neighbor RSTA, the independent STA TSF value associated with the neighbor RSTA dependent on the difference between the neighbor RSTA TSF value received in the FTM frame and the independent STA TSF value.

In Example 10, the subject matter of Example 9 optionally includes that: the STA is mobile, and the FTM frame comprises a limited number of neighbor RSTA TSF values among the plurality of neighbor RSTA values, the limited number of neighbor RSTA TSF values limited to neighbor RSTAs in an area toward which the STA is moving.

In Example 11, the subject matter of any one or more of Examples 9-10 optionally include that: a number of neighbor RSTA TSF values in the FTM frame is dependent on the RSTA.

In Example 12, the subject matter of any one or more of Examples 1-11 optionally include that: the RSTA is one a plurality of RSTAs, and the processing circuitry is further arranged to: communicate with the plurality of RSTAs using time-division duplex (TDD) on one or more channels, each channel used to provide communications between the STA and at most one RSTA.

In Example 13, the subject matter of Example 12 optionally includes that the processing circuitry is further arranged to: adjust the STA TSF dependent on the difference between the STA TSF value and the RSTA TSF value for each of the plurality of RSTAs.

In Example 14, the subject matter of any one or more of Examples 12-13 optionally include that the processing circuitry is further arranged to: adjust the STA TSF dependent on the difference between the RSTA TSF value and the STA TSF value of one of the plurality of RSTAs having a predetermined set of characteristics without using communications with the remaining RSTAs of the plurality of RSTAs.

In Example 15, the subject matter of any one or more of Examples 1-14 optionally include that the processing circuitry is further arranged to: refrain from performing active or passive scanning and instead adjust the STA TSF using the RSTA TSF.

In Example 16, the subject matter of any one or more of Examples 1-15 optionally include that: the RSTA TSF value is provided in a reserved field of a parameter of the FTM frame.

In Example 17, the subject matter of any one or more of Examples 1-16 optionally include that: the RSTA TSF value is provided in an additional information element of the FTM frame.

In Example 18, the subject matter of any one or more of Examples 1-17 optionally include, further comprising an antenna configured to transmit and receive communications between the transceiver and the RSTA.

Example 19 is an apparatus of an access point (AP) comprising: a transceiver arranged to communicate with a station (STA); and processing circuitry arranged to: configure the transceiver to receive from the STA at least one of a Fine Timing Measurement (FTM) Request or FTM Request trigger frame; capture an AP Time Synchronization Function (TSF) value of the time the at least one of the FTM request or FTM Request trigger frame is received by the AP; configure the transceiver to transmit a FTM request acknowledgement (ACK) signal to the STA indicating successful reception of the at least one of the FTM request or trigger frame by the AP; and configure the transceiver to transmit to the STA a FTM frame in response to the AP receiving the at least one of the FTM Request or FTM Request trigger frame, the FTM frame comprising an AP TSF value of a time the at least one of the FTM Request or FTM Request trigger frame was transmitted by the STA.

In Example 20, the subject matter of Example 19 optionally includes that the processing circuitry is further arranged to: configure the transceiver to receive from the STA a FTM acknowledgement (ACK) signal indicating successful reception of the FTM frame by the STA.

In Example 21, the subject matter of Example 20 optionally includes that the processing circuitry is further arranged to: configure the transceiver to transmit a second FTM frame to the STA, the second FTM frame comprising at least one of a FTM ACK TSF value indicating the time the FTM ACK signal was transmitted by the STA as determined by the AP and a time difference between the FTM ACK TSF value and the AP TSF value.

In Example 22, the subject matter of any one or more of Examples 19-21 optionally include that: the FTM frame comprises a burst duration and a burst period, the burst duration indicating a time during which a plurality of FTM frames are to be transmitted from the AP to the STA and the STA is to transmit to the AP a FTM Response acknowledgement (ACK) signal in response to each received FTM frame, the burst period indicating a period between adjacent burst durations, and the processing circuitry is further arranged to configure the transceiver to transmit a subsequent FTM response in response to the AP having received a FTM ACK signal in response to an immediately preceding FTM frame.

In Example 23, the subject matter of any one or more of Examples 19-22 optionally include that: the AP TSF value is provided in one of a reserved field of a parameter of the FTM frame an additional information element of the FTM frame, and receive the at least one of the FTM request or trigger frame from the STA rather than receiving an active scanning probe from the STA.

Example 24 is a non-transitory computer-readable storage medium that stores instructions for execution by one or more processors of a station (STA) to configure the STA to communicate with a responding STA (RSTA), the one or more processors to configure the STA to: transmit a request from the STA to the RSTA; capture a first time value at a transmission time of transmitting the request; receive at least one response containing a second time value indicating a time the request was received by the RSTA; compare the first and second time values to obtain a time comparison; and adjust an internal clock of the STA based on the comparison to match a time of the RSTA.

In Example 25, the subject matter of Example 24 optionally includes that: the at least one response comprises a Fine Timing Measurement (FTM) frame comprising a FTM Request Time Synchronization Function (TSF) value field that contains a full TSF value of a TSF of the RSTA at the reception of a last acknowledged FTM Request frame and only part of the TSF value of the RSTA at a time of receiving the last acknowledged FTM Request frame.

Example 26 is a method of providing a Fine Timing Measurement (FTM) with a responding station (RSTA), the method comprising: receiving at least one of a FTM Request or FTM Request trigger frame from a station (STA), the at least one of a FTM request or trigger frame comprising a burst duration; capturing an RSTA Time Synchronization Function (TSF) value of the time the at least one of the FTM request or trigger frame is received by the RSTA; and transmitting to the STA a series of FTM frames during the burst duration after receiving the at least one of the FTM Request or FTM Request trigger frame, at least a first of the FTM frames comprising the RSTA TSF value.

In Example 27, the subject matter of Example 26 optionally includes, further comprising: receiving from the STA a FTM acknowledgement (ACK) signal indicating successful reception of a particular FTM frame by the STA; and transmitting a FTM frame subsequent to the particular FTM frame to the STA in response to receiving the FTM ACK signal to the particular FTM frame.

In Example 28, the subject matter of any one or more of Examples 26-27 optionally include, further comprising: transmitting a FTM request acknowledgement (ACK) signal in response to receiving the at least one of the FTM request or trigger frame prior to transmitting the series of FTM frames.

Example 29 is a non-transitory computer-readable storage medium that stores instructions for execution by one or more processors of an access point (AP) to configure the AP to communicate with a station (STA), the one or more processors to configure the AP to: receive from the STA at least one of a Fine Timing Measurement (FTM) Request or FTM Request trigger frame; capture an AP Time Synchronization Function (TSF) value of the time the at least one of the FTM request or FTM Request trigger frame is received by the AP; transmit a FTM request acknowledgement (ACK) signal to the STA indicating successful reception of the at least one of the FTM request or trigger frame by the AP; and transmit to the STA a FTM frame in response to the AP receiving the at least one of the FTM Request or FTM Request trigger frame, the FTM frame comprising an AP TSF value of a time the at least one of the FTM Request or FTM Request trigger frame was transmitted by the STA.

In Example 30, the subject matter of Example 29 optionally includes that the one or more processors further configure the AP to: configure the transceiver to receive from the STA a FTM acknowledgement (ACK) signal indicating successful reception of the FTM frame by the STA.

In Example 31, the subject matter of any one or more of Examples 29-30 optionally include that the one or more processors further configure the AP to: transmit a second FTM frame to the STA, the second FTM frame comprising at least one of a FTM ACK TSF value indicating the time the FTM ACK signal was transmitted by the STA as determined by the AP and a time difference between the FTM ACK TSF value and the AP TSF value.

In Example 32, the subject matter of any one or more of Examples 29-31 optionally include that: the FTM frame comprises a burst duration and a burst period, the burst duration indicating a time during which a plurality of FTM frames are to be transmitted from the AP to the STA and the STA is to transmit to the AP a FTM Response acknowledgement (ACK) signal in response to each received FTM frame, the burst period indicating a period between adjacent burst durations, and the one or more processors further configure the AP to transmit a subsequent FTM response in response to the AP having received a FTM ACK signal in response to an immediately preceding FTM frame.

In Example 33, the subject matter of any one or more of Examples 29-32 optionally include that: the AP TSF value is provided in one of a reserved field of a parameter of the FTM frame an additional information element of the FTM frame, and receive the at least one of the FTM request or trigger frame from the STA rather than receiving an active scanning probe from the STA.

Example 34 is a method of providing a Fine Timing Measurement (FTM) with a station (STA), the method comprising: transmitting to a responding STA (RSTA) at least one of a Fine Timing Measurement (FTM) request or FTM trigger frame; capturing a Time Synchronization Function (TSF) value of the STA, the TSF being of a time the at least one of the FTM request or FTM trigger frame is transmitted to the RSTA as determined by the STA; receiving from the RSTA an FTM frame in response to the RSTA receiving the at least one of the FTM request or FTM trigger frame, the FTM frame comprising an RSTA TSF value of a time the at least one of the FTM request or FTM trigger frame was transmitted by the STA; and adjusting the STA TSF dependent on the difference between the RSTA TSF value and the STA TSF value to synchronize to the RSTA TSF value.

In Example 35, the subject matter of Example 34 optionally includes further comprising: receiving an FTM request acknowledgement (ACK) signal from the RSTA indicating successful reception of the at least one of the FTM request or FTM trigger frame by the RSTA, transmitting a FTM response ACK signal to the RSTA indicating successful reception of the FTM frame by the STA, receiving a second FTM frame from the RSTA, the second FTM frame comprising at least one of a FTM response ACK TSF value indicating the time the FTM response ACK signal was transmitted by the STA as determined by the RSTA and a time difference between the FTM response ACK TSF value and the RSTA TSF value, and determining whether further adjustment of the STA TSF is to be performed dependent on the at least one of the FTM response ACK TSF value and the time difference and if so, adjust the STA TSF dependent on the at least one of the FTM response ACK TSF value and the time difference.

In Example 36, the subject matter of any one or more of Examples 34-35 optionally include that the FTM frame comprises a burst duration and a burst period, the burst duration indicating a time during which a plurality of FTM responses are to be transmitted from the RSTA to the STA and the STA is to transmit to the RSTA a FTM response acknowledgement (ACK) signal in response to each received FTM response, the burst period indicating a period between adjacent burst durations, the method further comprises: receiving a subsequent FTM response in response to the RSTA having received a FTM response ACK signal in response to an immediately preceding FTM response and adjusting the STA TSF dependent on a moving average of differences between consecutive RSTA TSF value adjustments.

In Example 37, the subject matter of any one or more of Examples 34-36 optionally include that the RSTA is adjacent to a neighbor RSTA having a neighbor RSTA TSF value independent of the RSTA TSF value, and the FTM frame further comprises the neighbor RSTA TSF value of the time the at least one of the FTM Request or FTM Trigger frame was transmitted by the STA.

In Example 38, the subject matter of Example 37 optionally includes that the RSTA is adjacent to a plurality neighbor RSTAs, the FTM frame further comprises a neighbor RSTA TSF value, for each neighbor RSTA, of the time the at least one of the FTM request or FTM trigger frame was transmitted by the STA, and the method further comprises: maintaining an independent STA TSF value for each neighbor RSTA, and adjusting, for each neighbor RSTA, the independent STA TSF value associated with the neighbor RSTA dependent on the difference between the neighbor RSTA TSF value received in the FTM frame and the independent STA TSF value.

In Example 39, the subject matter of Example 38 optionally includes that the STA is mobile, and the FTM frame comprises a limited number of neighbor RSTA TSF values among the plurality of neighbor RSTA values, the limited number of neighbor RSTA TSF values limited to neighbor RSTAs in an area toward which the STA is moving.

In Example 40, the subject matter of any one or more of Examples 34-39 optionally include that the RSTA is one a plurality of RSTAs, and the method further comprises: communicating with the plurality of RSTAs using time-division duplex (TDD) on one or more channels, each channel used to provide communications between the STA and at most one RSTA.

In Example 41, the subject matter of Example 40 optionally includes that the method further comprises at least one of: adjusting the STA TSF dependent on the difference between the STA TSF value and the RSTA TSF value for each of the plurality of RSTAs, and adjusting the STA TSF dependent on the difference between the RSTA TSF value and the STA TSF value of one of the plurality of RSTAs having a predetermined set of characteristics without using communications with the remaining RSTAs of the plurality of RSTAs.

In Example 42, the subject matter of any one or more of Examples 34-41 optionally include that the method further comprises: refraining from performing active or passive scanning and instead adjust the STA TSF using the RSTA TSF.

The embodiments described herein may be implemented fully or partially in one or a combination of hardware, firmware and software. The software and/or firmware may take the form of instructions contained in or on a non-transitory computer-readable storage medium computer-readable storage device, which may be read and executed by at least one processor to perform the operations described herein. Those instructions may then be read and executed by one or more processors to enable performance of the operations described herein. The instructions may be in any suitable form, such as but not limited to source code, compiled code, interpreted code, executable code, static code, dynamic code, and the like. A computer-readable storage device may include any tangible non-transitory mechanism for storing information in a form readable by a machine (e.g., a computer). For example, the form may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. An apparatus of a station (STA) comprising:
a transceiver arranged to communicate with a responding STA (RSTA); and
processing circuitry arranged to:
configure the transceiver to transmit to the RSTA at least one of a Fine Timing Measurement (FTM) request or FTM trigger frame;
capture a Time Synchronization Function (TSF) value of the STA, the TSF being of a time the at least one of the FTM request or FTM trigger frame is transmitted to the RSTA as determined by the STA;
configure the transceiver to receive from the RSTA an FTM frame in response to the RSTA receiving the at least one of the FTM request or FTM trigger frame, the FTM frame comprising an RSTA TSF value of a time the at least one of the FTM request or FTM trigger frame was transmitted by the STA; and
adjust the STA TSF dependent on the difference between the RSTA TSF value and the STA TSF value to synchronize to the RSTA TSF value,
wherein the FTM frame comprises a burst duration and a burst period, the burst duration indicating a time during which a plurality of FTM responses are to be transmitted from the RSTA to the STA, the burst period indicating a period between adjacent burst durations.

2. The apparatus of claim 1, wherein the processing circuitry is further arranged to:
configure the transceiver to receive an FTM request acknowledgement (ACK) signal from the RSTA indicating successful reception of the at least one of the FTM request or FTM trigger frame by the RSTA.

3. The apparatus of claim 1, wherein the processing circuitry is further arranged to:
configure the transceiver to transmit a FTM response acknowledgement (ACK) signal to the RSTA indicating successful reception of the FTM frame by the STA.

4. The apparatus of claim 3, wherein the processing circuitry is further arranged to:
configure the transceiver to receive a second FTM frame from the RSTA, the second FTM frame comprising at least one of a FTM response ACK TSF value indicating the time the FTM response ACK signal was transmitted by the STA as determined by the RSTA and a time difference between the FTM response ACK TSF value and the RSTA TSF value.

5. The apparatus of claim 4, wherein the processing circuitry is further arranged to:
determine whether further adjustment of the STA TSF is to be performed dependent on the at least one of the FTM response ACK TSF value and the time difference and if so, adjust the STA TSF dependent on the at least one of the FTM response ACK TSF value and the time difference.

6. The apparatus of claim 1, wherein:
the processing circuitry is further arranged to configure the transceiver to receive a subsequent FTM response in response to the RSTA having received a FTM response acknowledgement (ACK) signal in response to an immediately preceding FTM response.

7. The apparatus of claim 6, wherein the processing circuitry is further arranged to:
adjust the STA TSF dependent on a moving average of differences between consecutive RSTA TSF value adjustments.

8. The apparatus of claim 1, wherein:
the RSTA is adjacent to a neighbor RSTA having a neighbor RSTA TSF value independent of the RSTA TSF value, and
the FTM frame further comprises the neighbor RSTA TSF value of the time the at least one of the FTM Request or FTM Trigger frame was transmitted by the STA.

9. The apparatus of claim 8, wherein:
the RSTA is adjacent to a plurality neighbor RSTAs,
the FTM frame further comprises a neighbor RSTA TSF value, for each neighbor RSTA, of the time the at least one of the FTM request or FTM trigger frame was transmitted by the STA, and
the processing circuitry is further arranged to:
maintain an independent STA TSF value for each neighbor RSTA, and
adjust, for each neighbor RSTA, the independent STA TSF value associated with the neighbor RSTA dependent on the difference between the neighbor RSTA TSF value received in the FTM frame and the independent STA TSF value.

10. The apparatus of claim 9, wherein:
the STA is mobile, and
the FTM frame comprises a limited number of neighbor RSTA TSF values among the plurality of neighbor RSTA values, the limited number of neighbor RSTA TSF values limited to neighbor RSTAs in an area toward which the STA is moving.

11. The apparatus of claim 9, wherein:
a number of neighbor RSTA TSF values in the FTM frame is dependent on the RSTA.

12. The apparatus of claim 1, wherein:
the RSTA is one a plurality of RSTAs, and
the processing circuitry is further arranged to:
communicate with the plurality of RSTAs using time-division duplex (TDD) on one or more channels, each channel used to provide communications between the STA and at most one RSTA.

13. The apparatus of claim 12, wherein the processing circuitry is further arranged to:
adjust the STA TSF dependent on the difference between the STA TSF value and the RSTA TSF value for each of the plurality of RSTAs.

14. The apparatus of claim 12, wherein the processing circuitry is further arranged to:
adjust the STA TSF dependent on the difference between the RSTA TSF value and the STA TSF value of one of the plurality of RSTAs having a predetermined set of characteristics without using communications with the remaining RSTAs of the plurality of RSTAs.

15. The apparatus of claim 1, wherein the processing circuitry is further arranged to:
refrain from performing active or passive scanning and instead adjust the STA TSF using the RSTA TSF.

16. The apparatus of claim 1, wherein:
the RSTA TSF value is provided in a reserved field of a parameter of the FTM frame.

17. The apparatus of claim 1, wherein:
the RSTA TSF value is provided in an additional information element of the FTM frame.

18. The apparatus of claim 1, further comprising an antenna configured to transmit and receive communications between the transceiver and the RSTA.

19. An apparatus of an access point (AP) comprising:
a transceiver arranged to communicate with a station (STA); and
processing circuitry arranged to:
configure the transceiver to receive from the STA at least one of a Fine Timing Measurement (FTM) Request or FTM Request trigger frame;
capture an AP Time Synchronization Function (TSF) value of the time the at least one of the FTM request or FTM Request trigger frame is received by the AP;
configure the transceiver to transmit a FTM request acknowledgement (ACK) signal to the STA indicating successful reception of the at least one of the FTM request or trigger frame by the AP; and configure the transceiver to transmit to the STA a FTM frame in response to reception by the AP of the at least one of the FTM Request or FTM Request trigger frame, wherein the FTM frame comprises:
an AP TSF value of a time the at least one of the FTM Request or FTM Request trigger frame was transmitted by the STA,
a burst duration that indicates a time during which a plurality of FTM responses are to be transmitted from the RSTA to the STA, and
a burst period that indicates a period between adjacent burst durations.

20. The apparatus of claim 19, wherein the processing circuitry is further arranged to:
configure the transceiver to receive from the STA a FTM acknowledgement (ACK) signal indicating successful reception of the FTM frame by the STA.

21. The apparatus of claim 20, wherein the processing circuitry is further arranged to:
configure the transceiver to transmit a second FTM frame to the STA, the second FTM frame comprising at least one of a FTM ACK TSF value indicating the time the FTM ACK signal was transmitted by the STA as determined by the AP and a time difference between the FTM ACK TSF value and the AP TSF value.

22. The apparatus of claim 19, wherein:
the processing circuitry is further arranged to configure the transceiver to transmit a subsequent FTM response in response to the AP having received a FTM response acknowledgement (ACK) signal in response to an immediately preceding FTM frame.

23. The apparatus of claim 19, wherein:
the AP TSF value is provided in one of a reserved field of a parameter of the FTM frame an additional information element of the FTM frame, and
receive the at least one of the FTM request or trigger frame from the STA rather than receiving an active scanning probe from the STA.

24. A non-transitory computer-readable storage medium that stores instructions for execution by one or more processors of a station (STA) to configure the STA to communicate with a responding STA (RSTA), the one or more processors to configure the STA to:
transmit a request from the STA to the RSTA;
capture a first time value at a transmission time of transmitting the request;
receive at least one response containing a second time value indicating a time the request was received by the RSTA;
compare the first and second time values to obtain a time comparison; and
adjust an internal clock of the STA based on the comparison to match a time of the RSTA,
wherein the request comprises a burst duration and a burst period, the burst duration indicating a time during which a plurality of the at least one responses are to be transmitted from the RSTA to the STA, the burst period indicating a period between adjacent burst durations.

25. The medium of claim 24, wherein:
the at least one response comprises a Fine Timing Measurement (FTM) frame comprising a FTM Request Time Synchronization Function (TSF) value field that contains a full TSF value of a TSF of the RSTA at the reception of a last acknowledged FTM Request frame and only part of the TSF value of the RSTA at a time of receiving the last acknowledged FTM Request frame.

26. A method of providing a Fine Timing Measurement (FTM) with a responding station (RSTA), the method comprising:
receiving at least one of a FTM Request or FTM Request trigger frame from a station (STA), the at least one of a FTM request or trigger frame comprising a burst duration;
capturing an RSTA Time Synchronization Function (TSF) value of the time the at least one of the FTM request or trigger frame is received by the RSTA; and
transmitting to the STA a series of FTM frames during the burst duration after receiving the at least one of the FTM Request or FTM Request trigger frame, at least a first of the FTM frames comprising the RSTA TSF value,
wherein each FTM frame comprises a burst duration and a burst period, the burst duration indicating a time during which a plurality of FTM responses are to be transmitted from the RSTA to the STA, the burst period indicating a period between adjacent burst durations.

27. The method of claim 26, further comprising:
receiving from the STA a FTM acknowledgement (ACK) signal indicating successful reception of a particular FTM frame by the STA; and
transmitting a FTM frame subsequent to the particular FTM frame to the STA in response to receiving the FTM ACK signal to the particular FTM frame.

28. The method of claim 26, further comprising:
transmitting a FTM request acknowledgement (ACK) signal in response to receiving the at least one of the FTM request or trigger frame prior to transmitting the series of FTM frames.

29. The apparatus of claim 1, wherein:
a periodicity of the FTM responses is dependent on transmission of FTW response acknowledgement (ACK) signals to the RSTA in response to reception of the FTM responses.

* * * * *

UNITED STATES PATENT AND TRADEMARK OFFICE
CERTIFICATE OF CORRECTION

PATENT NO. : 9,999,010 B2
APPLICATION NO. : 14/934739
DATED : June 12, 2018
INVENTOR(S) : Jonathan Segev Page 1 of 1

It is certified that error appears in the above-identified patent and that said Letters Patent is hereby corrected as shown below:

In the Claims

In Column 26, Line 50, in Claim 29, delete "FTW" and insert --FTM-- therefor

Signed and Sealed this
Eighteenth Day of June, 2019

Andrei Iancu
*Director of the United States Patent and Trademark Office*